US007270433B2

(12) United States Patent
Danek et al.

(10) Patent No.: US 7,270,433 B2
(45) Date of Patent: Sep. 18, 2007

(54) MIRROR SWITCH ASSEMBLY

(75) Inventors: Daniel J. Danek, Berwyn, IL (US); Robert L. Spike, Park Ridge, IL (US)

(73) Assignee: Illinois Tool Works Inc, Glenview, IL (US)

( * ) Notice: Subject to any disclaimer, the term of this patent is extended or adjusted under 35 U.S.C. 154(b) by 325 days.

(21) Appl. No.: 11/066,818

(22) Filed: Feb. 25, 2005

(65) Prior Publication Data
US 2006/0082910 A1   Apr. 20, 2006

Related U.S. Application Data

(60) Provisional application No. 60/620,446, filed on Oct. 20, 2004.

(51) Int. Cl.
    G02B 5/08    (2006.01)
    G02B 7/182   (2006.01)
    B60R 1/06    (2006.01)
(52) U.S. Cl. .................. 359/876; 359/877; 359/872; 307/10.1
(58) Field of Classification Search ............... 359/841, 359/872, 875, 876, 877; 307/10.1
    See application file for complete search history.

(56) References Cited

U.S. PATENT DOCUMENTS

| 4,405,887 A | * | 9/1983  | Tamura et al. ........... 318/443 |
| 4,657,362 A | * | 4/1987  | Suzuki ..................... 359/841 |
| 4,938,577 A | * | 7/1990  | Sugita ..................... 359/843 |
| 4,948,242 A | * | 8/1990  | Desmond et al. .......... 359/877 |
| 5,148,014 A | * | 9/1992  | Lynam et al. ......... 250/214 AL |
| 5,196,965 A | * | 3/1993  | Lang et al. ................ 359/841 |
| 5,514,940 A | * | 5/1996  | Okamoto ................... 318/469 |
| 5,684,647 A | * | 11/1997 | Rouleau ................... 359/843 |
| 6,198,175 B1 | * | 3/2001 | Kalb et al. ................. 307/10.1 |

FOREIGN PATENT DOCUMENTS

| JP | 58-218448  | * 12/1983 |
| JP | 58-224829  | * 12/1983 |
| JP | 09-309382  | * 12/1997 |

* cited by examiner

Primary Examiner—Ricky D. Shafer
(74) Attorney, Agent, or Firm—Mark W. Croll; Paul F. Donovan

(57) ABSTRACT

A mirror switch assembly that may be incorporated with a mirror unit for tilting a mirror. A set of contacts rotates when the mirror unit is rotated between a horizontal orientation and a vertical orientation. The set of contacts is electrically coupled to two motors and to a set of terminals. The set of terminals is electrically coupled to at least one mirror adjustment switch that is located in the interior of the vehicle. When the set of contacts rotate, the connections between the terminals and the motors are reconfigured to compensate for a change in orientation of the mirror.

20 Claims, 4 Drawing Sheets

MIRROR SWITCH ASSEMBLY

CROSS-REFERENCE TO RELATED APPLICATION

This Non-Provisional application claims benefit to U.S. Provision Application Ser. No. 60/620,446 filed Oct. 20, 2004.

FIELD OF THE INVENTION

The present invention relates generally to a switch assembly, and more particularly, to a switch assembly for adjusting a mirror of a vehicle.

BACKGROUND OF THE INVENTION

It is known that mirrors on vehicles are pivotable or adjustable to improve the driver's visibility. These known mirrors are also retractable to avoid inadvertent damage to the mirrors, especially in tight clearance situations. Typically, the known mirrors include switch assemblies and motors to facilitate the horizontal and vertical movement of the mirrors. In particular, it is common for vehicle mirrors to use two motors to tilt the mirrors in both the up/down and left/right directions. To effect this movement, switch assemblies are used, which are controlled by the vehicle's driver. By pressing on one or more buttons located in the interior of the vehicle, the driver controls the switch assemblies which in turn control the motors that effect movement or adjustment of the mirrors.

Certain drawbacks exist with known switch assemblies for controlling the movement or adjustment of the mirrors. For example, a known switch assembly uses a switch unit that includes a pivoting weight that closes or opens a photo-electric sensor to detect the change in mirror orientation and to switch motor circuitry to provide consistency to the driver when adjusting the mirror. However, this approach requires extensive electronic circuitry and relays that substantially increase the cost of the switch assembly. Also, the known switch assembly is a highly complex unit that includes in addition to the extensive electronic circuitry and relays, three sets of silver contacts to control the motors. Moreover, another drawback with the known switch assembly and mirror unit is the generation of noise when switching or controlling the motors—noise that may be objectionable to the driver. Yet another drawback is if the vehicle is on a sufficiently large slope. Under this condition, an internal shutter of the known switch assembly may incorrectly configure the circuitry.

The present invention overcomes these and other known drawbacks with existing mirror units and switch assemblies by providing a mirror unit and switch assembly that reduces cost, complexity and noise, and yet maintains the mirror control features.

SUMMARY OF THE INVENTION

The present invention is directed to a mirror switch assembly that may be incorporated in an external mirror unit of a vehicle. With an aspect of the invention, a set of contacts rotates when a mirror is rotated between a horizontal orientation and a vertical orientation. The set of contacts are electrically coupled to two motors and to a set of terminals. The set of terminals are electrically coupled to at least one mirror adjustment switch that is located in the interior of the vehicle. When the mirror is re-oriented, the set of contacts rotate, and the connections between the terminals and the motors are reconfigured to compensate for the change in orientation of the mirror. The invention also includes a rotor of a mirror switch assembly that rotates when the mirror unit is rotated, causing the set of contacts to rotate.

Other features and advantages of the invention will become apparent to those skilled in the art upon review of the following detailed description, claims and drawings in which like numerals are used to designate like features.

Figure 1:
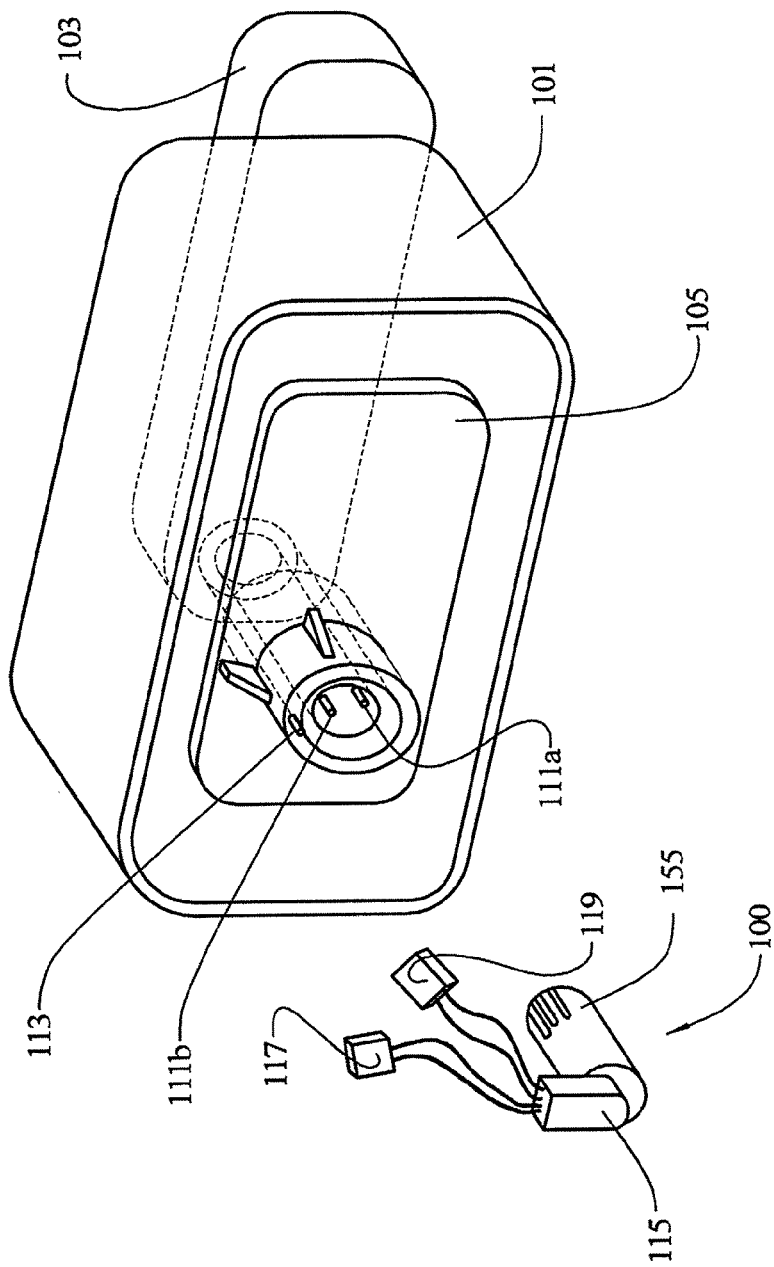
FIG. 1 shows a mirror switch assembly mounted in a mirror housing in accordance with an embodiment of the invention.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF THE EMBODIMENTS

Referring to the FIGS., the present invention is directed to a mirror switch assembly 100 that may be used in a vehicle mirror unit to control tilting of a mirror. Referring to FIG. 1, the mirror switch assembly 100 is depicted, as well as an exemplary mirror housing 101. The mirror housing 101 is operatively coupled to a mirror bracket 103 that is attached to the vehicle using conventional techniques. The mirror housing 101 is provided with a mirror frame 105 that is mounted to the mirror bracket 103. In use, the mirror frame 105 will pivot relative to the mirror bracket 103. The mirror frame 105 serves to mount a mirror to the mirror housing 101. The mirror frame 105 is also configured to contain two motors for adjusting the mirror in the vertical and horizontal directions. The movement of the mirror is controlled by the vehicle operator through the manipulation of one or more mirror adjustment control buttons or switches located in the interior of the vehicle. The mirror adjustment control buttons or switches are generally depicted by a connector 107, which is operatively connected to the switch assembly 100, as illustrated in FIG. 3.

Figure 2:
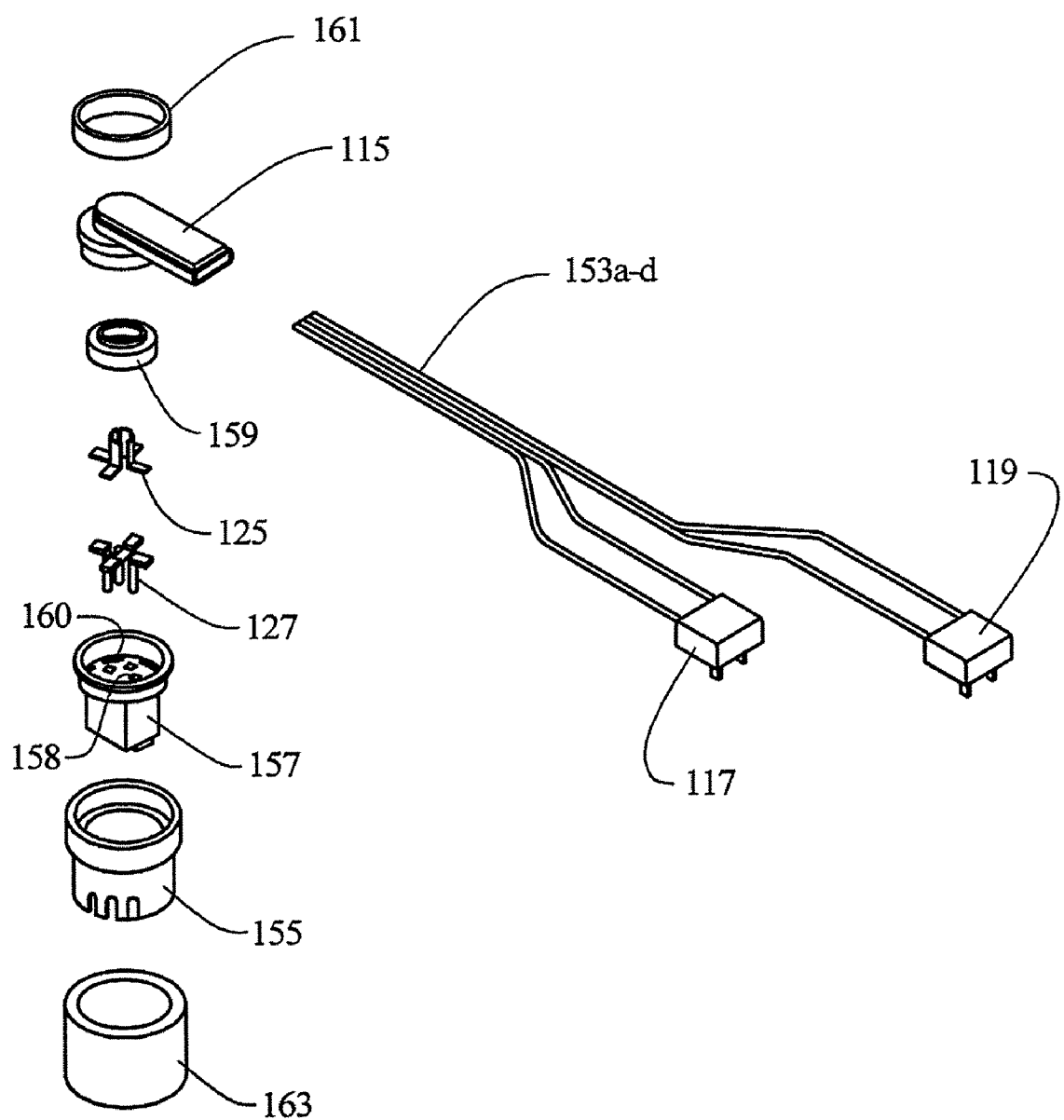
FIG. 2 shows an exploded view of a mirror switch assembly in accordance with an embodiment of the invention.
Figure 3:
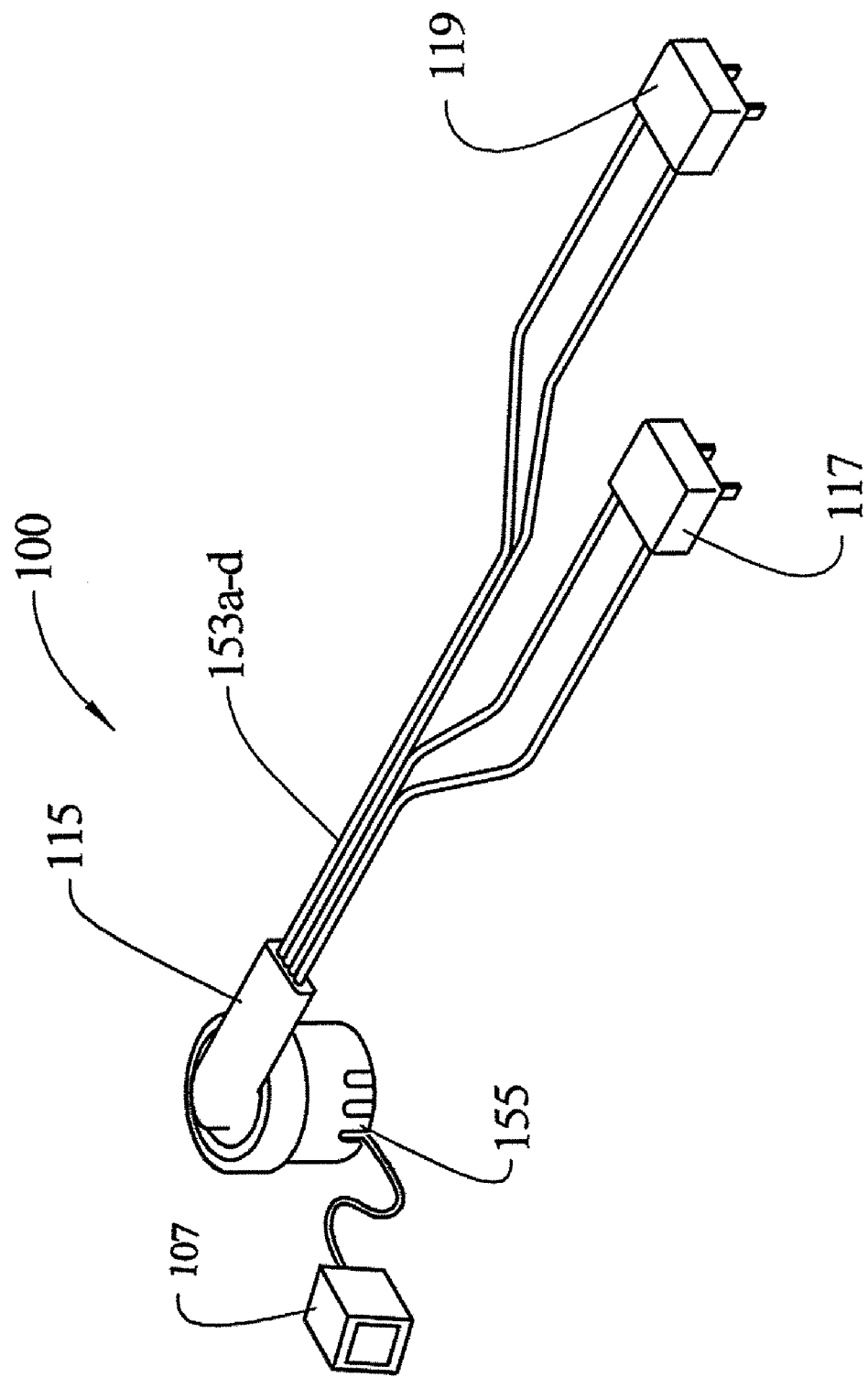
FIG. 3 shows the mirror switch assembly of FIG. 2.

FIG. 2 shows an exploded view of an exemplary mirror switch assembly 100, and FIG. 3 depicts an assembled view of the mirror switch assembly 100 of the present invention. As illustrated by these Figures, the mirror switch assembly 100 includes connectors 117 and 119 that couple to and control the motors positioned in the mirror frame 105. The connectors 117 and 119 are connected to a plurality of wires 153a-153d that pass through a rotor 115 and electrically couple to a set of contacts 125. In an exemplary embodiment, the set of contacts 125 includes four outwardly extending contacts. The rotor 115 will rotate when the mirror housing 101 is rotated, causing the set of contacts 125 to rotate relative to a set of terminals 127. Each of the contacts 125 may be soldered to the wires 153a-153d. The set of contacts 125 are mounted in a contact frame 159.

The switch assembly 100 also includes the set of terminals 127. Each of the terminals 127 are electrically coupled to the mirror adjustment control buttons or switches (generally depicted by connector 107. as shown in FIG. 3) and are configured to contact the contacts 125. In an exemplary embodiment, the set of terminals 127 include three outwardly extending terminals. As set forth below, the set of contacts 125 will rotate relative to the set of terminals 127. When the set of contacts 125 rotate, upon rotation of the mirror housing 101 and the rotor 115, the connections between the terminals 127 and the motors are reconfigured to compensate for a change in orientation of the mirror. exemplary embodiment, the set of terminals 127 include three outwardly extending terminals. As set forth below, the set of contacts 125 will rotate relative to the set of terminals 127. When the set of contacts 125 rotate, upon rotation of the mirror housing 101 and the rotor 115, the connections between the terminals 127 and the motors are reconfigured to compensate for a change in orientation of the mirror.

The set of terminals 127 are press fit into a connector frame 157 and through the openings 158 in the connector frame 157. To enhance the rotation of the contacts 125 relative to the terminals 127, the connector frame 157 may include inclined surfaces 160 positioned between each of the terminals to lift up and set down each of the contacts 125 as they rotate from one terminal to the next. This configuration will reduce wear between the contacts 125 and the terminals 127 caused by the contacts 125 scraping the edges of the terminals 127.

The connector frame 157 is received in a housing 155, which couples the switch assembly 100 to a mirror frame opening 163 (generally depicted in FIG. 2) configured on the mirror frame 105. More specifically, the housing 155 will mate with tabs 111a and 111b (FIG. 1) located within the mirror frame opening on the mirror frame 105. In an exemplary embodiment, the frame 157 and housing 155 may be made as a single, unitary structure and the terminals 127 may be insert molded into this single structure.

Turning back to FIG. 2, the switch assembly 100 also includes a retainer 161 that retains the rotor 115 and contact frame 159 within the housing 155. The retainer 161 may be press fit, affixed by an adhesive, or welded to the housing 155. In an exemplary embodiment, an o-ring may be positioned between the retainer 161 and rotor 115 to seal the assembly.

With the invention, the mirror orientation is altered by rotating the mirror housing 101. Rotating the mirror housing 101 causes one or more tabs 113 to rotate the rotor 115 and reposition the contacts 125 relative to the terminals 127. That is, the contacts 125 will rotate with the mirror housing 101 as it rotates. The outwardly extending contacts 125 are spring-loaded to ensure a solid pressure between the contacts 125 and the terminals 127. The spring loading is accomplished by using phosphor bronze stampings defining a configuration that, when installed, will cause the contacts 125 to bear against the mating terminals 127 with a cantilever spring force. A lubricant may be applied between the contacts and the terminals 127 to insure smooth action between the contacting surfaces to reduce wear, and provide corrosion protection to insure continued circuit operation.

As discussed below, when the mirror is changed in orientation, either from a vertical to a horizontal orientation or from a horizontal to a vertical orientation, the mirror control circuitry is reconfigured to re-assign the vehicle interior up/down and left/right adjustment switches or buttons to continue controlling the up/down and the left/right tilt directions, respectively. Additionally, the motor polarity for one of the motors is reversed, in which the common and the hot leads are flipped.

Figure 4:
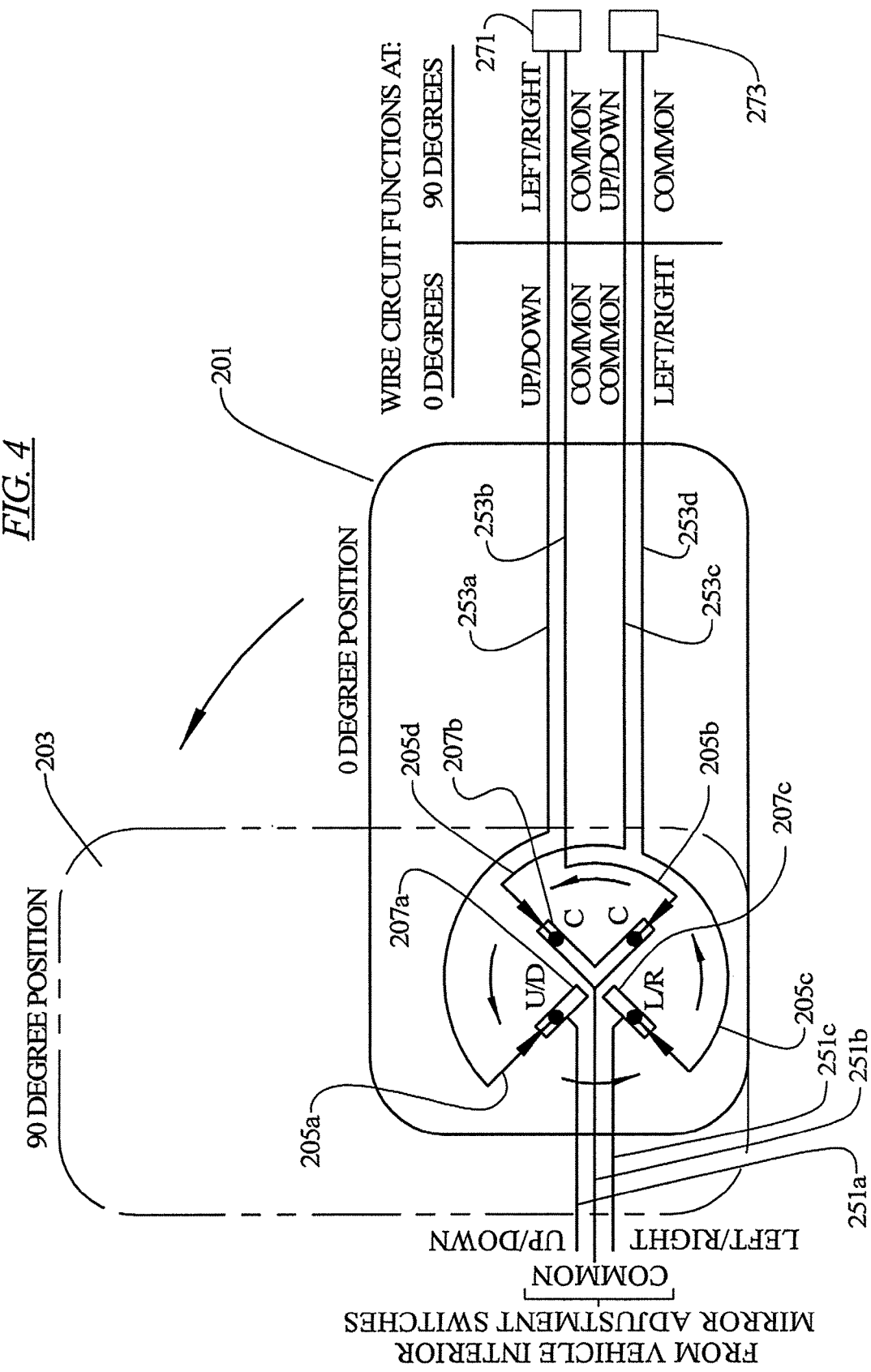
FIG. 4 shows circuitry to reconfigure the mirror switch assembly in response to a re-orientation of a mirror in accordance with an embodiment of the invention.

FIG. 4 shows circuitry to reconfigure the mirror switch assembly in response to a re-orientation of the mirror housing in accordance with an embodiment of the invention. Input wires 251a, 251b, and 251c (corresponding to up/down, common, and left/right, respectively) connect to the vehicle's interior mirror adjustment switches or buttons (generally depicted by connector 107). Output wires 253a and 253b connect to a first motor 271 and output wires 253c and 253d connect to a second motor 273. The motors 271 and 273 are generally depicted in FIG. 4 and may be permanent magnet DC motors that can reverse direction depending on the polarity of the voltage applied to their leads.

As illustrated by FIG. 4, when the mirror housing is in a horizontal orientation 201 (i.e., the zero degree position or normal position) output wires 253a and 253b activate the first motor 271 and consequently move the mirror up or down (vertical direction). The output wire 253b functions as the common for output wire 253a. When the mirror adjustment switch or button is pushed "UP" from inside the vehicle, the first motor 271 is provided with +12 VDC and the mirror is tilted up. When the mirror adjustment switch is pushed "DOWN," the polarity of output wires 253a and 253b are reversed by the mirror adjustment switch so that the mirror is tilted down with the first motor 271 functioning in a reverse direction. Also, in the horizontal orientation 201, output wires 253c and 253d activate the second motor 273 and consequently move the mirror left or right (in the horizontal direction). The output wire 253c functions as the common for output wire 253d.

In the horizontal orientation 201, contact 205a mates with terminal 207a, contact 205b mates with terminal 207b, contact 205c mates with terminal 207c, and contact 205d mates with terminal 207b. In an exemplary embodiment, the terminal 207a is electrically coupled to the up/down interior switch via input wire 251a, the terminal 207c is electrically coupled to the left/right interior switch via input wire 251c, and the terminal 207b corresponds to common via input wire 251b.

The operation of the mirror switch assembly in the horizontal orientation 201 may be summarized in Table 1 below (where + refers to +12 VDC with respect to system ground). It should be understood that the polarity function of the wires can be flipped per the table below since only one up/down or left/right adjustment can be made at a time and will be controlled from the interior mirror adjustment switch. It should be further understood that the items labeled common in FIG. 4 are common in that the particular circuit path indicated is shared on a single terminal in the connector frame and does not necessarily denote an electrical neutral common.

TABLE 1

| HORIZONTAL ORIENTATION (0 DEGREE POSITION) | | |
|---|---|---|
| output wire 253a (with respect to | interior switch pushed up | + signal |

TABLE 1-continued

HORIZONTAL ORIENTATION (0 DEGREE POSITION)

| | | |
|---|---|---|
| output wire 253b) | | |
| output wire 253b (with respect to output wire 253b) | interior switch pushed down | + signal |
| output wire 253d (with respect to output wire 253c) | interior switch pushed left | + signal |
| output wire 253c (with respect to output wire 253d) | interior switch pushed right | + signal |

When the mirror housing is rotated into a vertical orientation 203 (corresponding to the 90 degree position) output wires 253a-253d are reconfigured to the two motors 271, 273. This reconfiguration permits the mirror movement direction to match the vehicle interior switch direction. The contacts 205a-205d rotate with the rotor 115. In this reconfiguration, contact 205a will mate with terminal 207c, contact 205b will mate with terminal 207b, contact 205c will mate with terminal 207b, and contact 205d will mate with terminal 207a. As with the horizontal orientation 201, the terminal 207a corresponds to the up/down interior switch (via input wire 251a), terminal 207c corresponds to the left/right interior switch (via input wire 251c), and terminal 207b corresponds to common (via input wire 251b).

The operation of the mirror switch assembly in the vertical orientation 203 may be summarized in Table 2 below (where + refers to +12 VDC with respect to system ground). It should be understood that the polarity function of the wires can be flipped per the table below since only one up/down or left/right adjustment can be made at a time and will be controlled from the interior mirror adjustment switch. It should be also understood that the items labeled common in FIG. 4 are common in that the particular circuit path indicated is shared on a single terminal in the connector frame and does not necessarily denote an electrical neutral common.

TABLE 2

VERTICAL ORIENTATION (90 DEGREE POSITION)

| | | |
|---|---|---|
| output wire 253c (with respect to output wire 253d) | interior switch pushed up | + signal |
| output wire 253d (with respect to output wire 253c) | interior switch pushed down | + signal |
| output wire 253a (with respect to output wire 253b) | interior switch pushed left | + signal |
| output wire 253b (with respect to output wire 253a) | interior switch pushed right | + signal |

When rotating the mirror to the vertical orientation 203, the polarity to the second motor 273 is flipped so that the mirror movement direction matches the interior switch direction (i.e., pressing the vehicle interior mirror adjustment switch up causes the mirror to tilt up and pressing the mirror adjustment switch down cause the mirror to tilt down). However, the polarity to the first motor 271 is not reversed when the mirror is in the vertical orientation 203. Stated more generally, with the present invention, when the mirror is changed in orientation, either from a vertical to a horizontal orientation or vice versa, the mirror control circuitry described above is reconfigured to re-assign the vehicle interior up/down and left/right mirror adjustment switches to continue controlling the up/down and the left/right tilt directions, respectively. It does so by reversing the motor polarity for one of the motors, that is, by flipping the common and the hot leads. The polarity for the second motor remains unchanged. The discussion above applies to the left-hand mirror. For the right-hand mirror, the polarity is reversed for the first motor 271 and is not reversed for the second motor 273.

Variations and modifications of the foregoing are within the scope of the present invention. It should be understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A mirror switch assembly that reconfigures a mirror control system when an orientation of a mirror changes, the mirror switch assembly comprising:
   a rotor that is coupled to a mirror frame and that rotates as the orientation of the mirror changes;
   a switch housing that is connected to the rotor;
   a set of terminals located within the switch housing and that is electrically coupled to at least one mirror adjustment button; and
   a set of contacts located within the switch housing and that rotates with the rotor as the orientation of the mirror changes, that is electrically coupled to at least two motors causing the mirror to change a tilting position, and that is reconfigured when the rotor rotates to compensate for the orientation of the mirror.

2. The mirror switch assembly of claim 1, wherein the orientation of the mirror changes between a horizontal orientation and a vertical orientation.

3. The mirror switch assembly of claim 1, wherein the rotor couples to at least one tab on the mirror frame.

4. The mirror switch assembly of claim 1, wherein each contact in the set of contacts comprises a spring-loaded contact.

5. The mirror switch assembly of claim 1, further comprising a set of wires and a pair of connectors that electrically couple the at least two motors to the set of contacts.

6. The mirror switch assembly of claim 1, further comprising a first electrical connector that electrically couples a first pair of wires to a first motor of said at least two motors, and a second electrical connector that electrically couples a second pair of wires to a second motor of said at least two motors.

7. The mirror switch assembly of claim 1, further comprising a connector frame that contains the set of terminals, the connector frame defining inclined surfaces to facilitate the rotation of the set of contacts relative to the set of terminals.

8. The mirror switching assembly of claim 1, further comprising a contact frame that mounts the set of contacts.

9. The mirror switching system of claim 1, wherein the set of contacts includes four contacts, and wherein two contacts are electrically coupled to a first motor of said at least two motors and two other contacts are coupled to a second motor of said at least two motors.

10. The mirror switching system of claim 1, wherein the set of terminals includes three terminals, wherein a first terminal is electrically coupled to a vertical tilting control wire of the at least one mirror adjustment button, wherein a second terminal is electrically coupled to a horizontal tilting control wire of the at least one mirror adjustment button, and wherein a third terminal is electrically coupled to a common control wire of the at least one mirror adjustment button.

11. A mirror unit that is mounted on a vehicle, comprising:
a mirror housing;
a mirror frame that is housed in the mirror housing and that pivots on a mirror bracket;
a mirror that mounts to the mirror frame;
at least two motors that tilt the mirror horizontally and vertically; and
a mirror switch assembly that includes a rotor that is coupled to the mirror frame and that rotates as the orientation of the mirror changes, a set of terminals that is electrically coupled to at least one mirror adjustment button, and a set of contacts that rotates with the rotor as the orientation of the mirror changes, that is electrically coupled to the at least two motors causing the mirror to change a tilting position and that is reconfigured when the rotor rotates to compensate for the orientation of the mirror.

12. The mirror unit of claim 11, further comprising as couple the two motors to the set of contacts through the rotor.

13. The mirror unit of 11, wherein each contact in the set of contacts comprises a spring-loaded contact.

14. The mirror unit of claim 11, wherein the set of contacts is reconfigured to compensate for motor polarity in accordance with the orientation of the mirror.

15. The mirror unit of claim 11, further comprising a first electrical connector that electrically couples a first pair of wires to a first motor of said at least two motors, and a second electrical connector that electrically couples a second pair of wires to a second motor of said at least two motors.

16. The mirror unit of claim 11, wherein the set of contacts includes four contacts, and wherein two contacts are electrically coupled to a first motor of said at least two motors.

17. The mirror unit of claim 11, wherein the set of terminals includes three terminals, wherein a first terminal is electrically coupled to a vertical tilting control wire of the at least one mirror adjustment button, wherein a second terminal is electrically coupled to a horizontal tilting control wire of the at least one mirror adjustment button, and wherein a third terminal is electrically coupled to a common control wire of the at least one mirror adjustment button.

18. A mirror switch assembly that reconfigures a mirror control system when an orientation of a mirror changes, the mirror switch assembly comprising:
a rotor that is coupled to a mirror frame and that rotates as the orientation of the mirror changes;
a set of terminals that is electrically coupled to at least one mirror adjustment button, wherein the at least one mirror adjustment button enables a user to tilt the mirror in a vertical direction and in a horizontal direction;
a set of spring-loaded contacts that rotates with the rotor as the orientation of the mirror changes, that is electrically coupled to two motors causing the mirror to tilt horizontally and vertically, wherein one of the motors changeably tilts the mirror in the horizontal direction and the other motor changeably tilts the mirror in the vertical direction and that is reconfigured when the rotor rotates to compensate for the orientation of the mirror; and
a pair of connectors that couple the two motors to the set of spring-loaded contacts through the rotor.

19. The mirror switch assembly of claim 18, wherein the set of spring-loaded contacts includes four contacts, and wherein two contacts are electrically coupled to a first motor of said at least two motors and two other contacts are coupled to a second motor of said at least two motors.

20. The mirror switch assembly of claim 18, wherein the set of terminals includes three terminals, wherein a first terminal is electrically coupled to a vertical tilting control wire of the at least one mirror adjustment button, wherein a second terminal is electrically coupled to a horizontal tilting control wire of the at least one mirror adjustment button, and wherein a third terminal is electrically coupled to a common control wire of the at least one mirror adjustment button.

* * * * *